United States Patent
Chen et al.

(10) Patent No.: US 9,856,912 B2
(45) Date of Patent: Jan. 2, 2018

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Chi-Wei Wu, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 64 days.

(21) Appl. No.: 14/949,891

(22) Filed: Nov. 24, 2015

(65) Prior Publication Data

US 2017/0055708 A1    Mar. 2, 2017

(30) Foreign Application Priority Data

Aug. 31, 2015 (TW) .............................. 104128888 A (51) Int. Cl.
*A47B 88/00* (2017.01)
*F16C 29/00* (2006.01)
*A47B 88/49* (2017.01)
*A47B 88/57* (2017.01)
*A47B 88/423* (2017.01)

(52) U.S. Cl.
CPC ............ *F16C 29/005* (2013.01); *A47B 88/49* (2017.01); *A47B 88/57* (2017.01); *A47B 2088/4235* (2017.01); *A47B 2210/007* (2013.01)

(58) Field of Classification Search
CPC .... A47B 2210/0059; A47B 2210/0017; A47B 2210/0081; A47B 2210/0018; A47B 2210/007; A47B 88/57; A47B 88/403; A47B 2088/4235; H05K 7/1488; H05K 7/1489; H05K 7/183
USPC ...... 312/333, 334.44, 334.46, 334.47, 223.1, 312/265.1–265.4
See application file for complete search history.

(56) References Cited

U.S. PATENT DOCUMENTS 3,650,578 A * 3/1972 Del Vecchio .......... A47B 88/57
312/334.46
6,412,891 B1 7/2002 Liang
(Continued)

FOREIGN PATENT DOCUMENTS

JP    2012130668 A    7/2012

*Primary Examiner* — Janet M Wilkens
(74) *Attorney, Agent, or Firm* — Winston Hsu (57) ABSTRACT

A slide rail assembly includes a first rail, a second rail, a first engagement element, and a second engagement element. The first rail includes a first blocking part. The second rail is movably connected to the first rail. The first and second engagement elements are connected to the second rail. When the second rail moves relative to the first rail toward a first position, the first engagement element abuts against the blocking part of the first rail. When the first engagement element is operatively detached from the blocking part of the first rail, the second rail to is able to move relative to the first rail toward a second position from the first position. When the second rail is located at the second position, at least part of the second engagement element is adjacent to the blocking part of the first rail.

13 Claims, 11 Drawing Sheets

(56) References Cited

U.S. PATENT DOCUMENTS

| | | | | |
|---|---|---|---|---|
| 6,454,372 B1* | 9/2002 | Yang | .................... | A47B 88/493 |
| | | | | 312/334.13 |
| 6,457,790 B1* | 10/2002 | Liang | .................... | A47B 88/493 |
| | | | | 312/333 |
| 6,715,851 B1* | 4/2004 | Yang | .................... | A47B 88/493 |
| | | | | 312/334.46 |
| 6,883,885 B2* | 4/2005 | Judge | .................. | A47B 88/493 |
| | | | | 312/333 |
| 6,942,307 B1* | 9/2005 | Lammens | .............. | A47B 88/57 |
| | | | | 312/334.1 |
| 7,699,415 B2* | 4/2010 | Tseng | .................. | A47B 88/493 |
| | | | | 312/333 |
| 7,731,312 B2* | 6/2010 | Chen | ...................... | A47B 88/57 |
| | | | | 312/333 |
| 7,794,030 B2 | 9/2010 | Peng | | |
| 8,317,278 B2 | 11/2012 | Enos | | |
| 8,511,765 B1* | 8/2013 | Chen | ...................... | A47B 67/04 |
| | | | | 312/286 |
| 8,528,999 B2* | 9/2013 | Chen | .................... | F16C 29/005 |
| | | | | 312/333 |
| 8,534,782 B2 | 9/2013 | Yu | | |
| 8,733,864 B2* | 5/2014 | Chen | .................... | A47B 88/493 |
| | | | | 312/333 |
| 9,326,603 B2* | 5/2016 | Iwamoto | ............. | H05K 7/1489 |
| 2002/0175605 A1* | 11/2002 | Chen | ...................... | A47B 88/57 |
| | | | | 312/333 |
| 2008/0164795 A1 | 7/2008 | Peng | | |
| 2014/0044382 A1* | 2/2014 | Chen | .................... | A47B 88/493 |
| | | | | 384/21 |
| 2015/0123528 A1* | 5/2015 | Wu | ....................... | A47B 88/04 |
| | | | | 312/319.1 |

* cited by examiner

SLIDE RAIL ASSEMBLY

BACKGROUND OF THE INVENTION

1. Field of the Invention

The present invention relates to a slide rail assembly, and more particularly, to a slide rail assembly having blocking mechanisms when a second rail moves relative to a first rail to a first position and a second position.

2. Description of the Prior Art

Generally, a slide rail assembly comprises a first rail and a second rail capable of moving relative to the first rail, wherein the second rail is configured to install a carried object, for allowing the carried object to be pulled out or retrieved relative to the first rail through the second rail. For different market requirements, related products are developed to have a blocking mechanism for holding the second rail when being pulled to different positions, and a user can disable the blocking mechanism. For example, U.S. Pat. No. 6,412,891 B1, U.S. Pat. No. 8,317,278 B2 and U.S. Pat. No. 7,794,030 B2 already disclose such type of techniques. Thus these cases are provided for reference.

Current conventional slide rail assemblies usually provide a positioning or stopping function only when the slide rail assemblies are fully extended. However, when the slide rail assembly is partially extended, there is no design for the positioning or stopping function. Therefore, the present invention provides solutions for solving the problem.

SUMMARY OF THE INVENTION

The present invention relates to a slide rail assembly, which comprises a second rail capable of abutting against a first rail through an engagement element to be located at a first position relative to the first rail, and capable of moving to a second position relative to the first rail after the engagement element is released.

According to an embodiment of the present invention, a slide rail assembly comprises a first rail, a second rail, a first engagement element, and a second engagement element. The first rail comprises a front end and a first blocking part. The second rail is movably connected to the first rail and comprises a second blocking part. The first engagement element is connected to a first portion of the second rail. The second engagement element is connected to a second portion of the second rail and has a first guiding section. Wherein, when the second rail moves relative to the first rail to a first position beyond the front end of the first rail, the first engagement element abuts against the first blocking part of the first rail. Wherein, when the first engagement element is operatively detached from the first blocking part of the first rail for allowing the second rail to move relative to the first rail from the first position to a second position, the second engagement element crosses the first blocking part of the first rail with assistance of the first guiding section, and the second blocking part of the second rail abuts against the first blocking part of the first rail for holding the second rail at the second position relative to the first rail.

According to the above embodiment of the present invention, the first rail has a release opening, the first engagement element comprises an elastic part and a contact part connected to the elastic part. When the second rail is located at the first position relative to the first rail, the contact part of the first engagement element abuts against the first blocking part of the first rail and at least part of the elastic part of the first engagement element corresponds to the release opening. The slide rail assembly further comprises a release element installed on the first rail. The release element has a release part corresponding to the release opening.

According to the above embodiment of the present invention, the first rail has a release opening, the second engagement element comprises an elastic part and a contact part connected to the elastic part, and when the second rail is located at the second position relative to the first rail, the contact part of the second engagement element and the second blocking part of the second rail are respectively located at two sides of the first blocking part of the first rail, and at least part of the elastic part of the second engagement element corresponds to the release opening. The slide rail assembly further comprises a release element installed on the first rail. The release element has a release part corresponding to the release opening.

Preferably, the first engagement element has a second guiding section. When the second rail moves from the second position toward the first position, the first engagement element crosses the first blocking part of the first rail with assistance of the second guiding section.

According to the above embodiment of the present invention, the slide rail assembly further comprises a third rail. The first rail movably connected to the third rail.

According to another embodiment of the present invention, a slide rail assembly comprises a first rail, a second rail, a first engagement element, and a second engagement element. The first rail comprises a front end, a first blocking part, and a release opening. The first blocking part has a first side and a second side corresponding to the first side. The second rail is movably connected to the first rail. The first engagement element is connected to a first portion of the second rail. The second engagement element is connected to a second portion of the second rail and has a guiding section. When the second rail moves relative to the first rail along a direction to a first position beyond the front end of the first rail, the first engagement element abuts against the first side of the first blocking part of the first rail, and at least part of the first engagement element corresponds to the release opening. When the first engagement element is operatively detached from the first blocking part of the first rail through the release opening for allowing the second rail to move relative to the first rail from the first position toward the direction, until the second engagement element crosses the first blocking part of the first rail with assistance of the guiding section to be adjacent to the second side of the first blocking part, the second rail is located at a second position relative to the first rail.

According to the above another embodiment of the present invention, the second rail comprises a second blocking part. When the second rail is located at the second position, the second blocking part of the second rail is adjacent to the first side of the first blocking part of the first rail for holding the second rail at the second position relative to the first rail, and at least part of the second engagement element corresponds to the release opening.

According to another embodiment of the present invention, a slide rail assembly comprises a first rail, a second rail, a first engagement element, and a second engagement element. The first rail comprises a blocking part and a release opening. The second rail is movably connected to the first rail. The first engagement element is connected to a first portion of the second rail. The second engagement element connected to a second portion of the second rail. Wherein, when the second rail moves relative to the first rail along a direction to a first position, the first engagement element abuts against the blocking part of the first rail, and at least part of the first engagement element corresponds to the release opening. Wherein, when the first engagement element is operatively detached from the blocking part of the first rail through the release opening for enabling the second rail to move relative to the first rail along the direction from the first position to a second position, at least part of the second engagement element is adjacent to the blocking part of the first rail.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
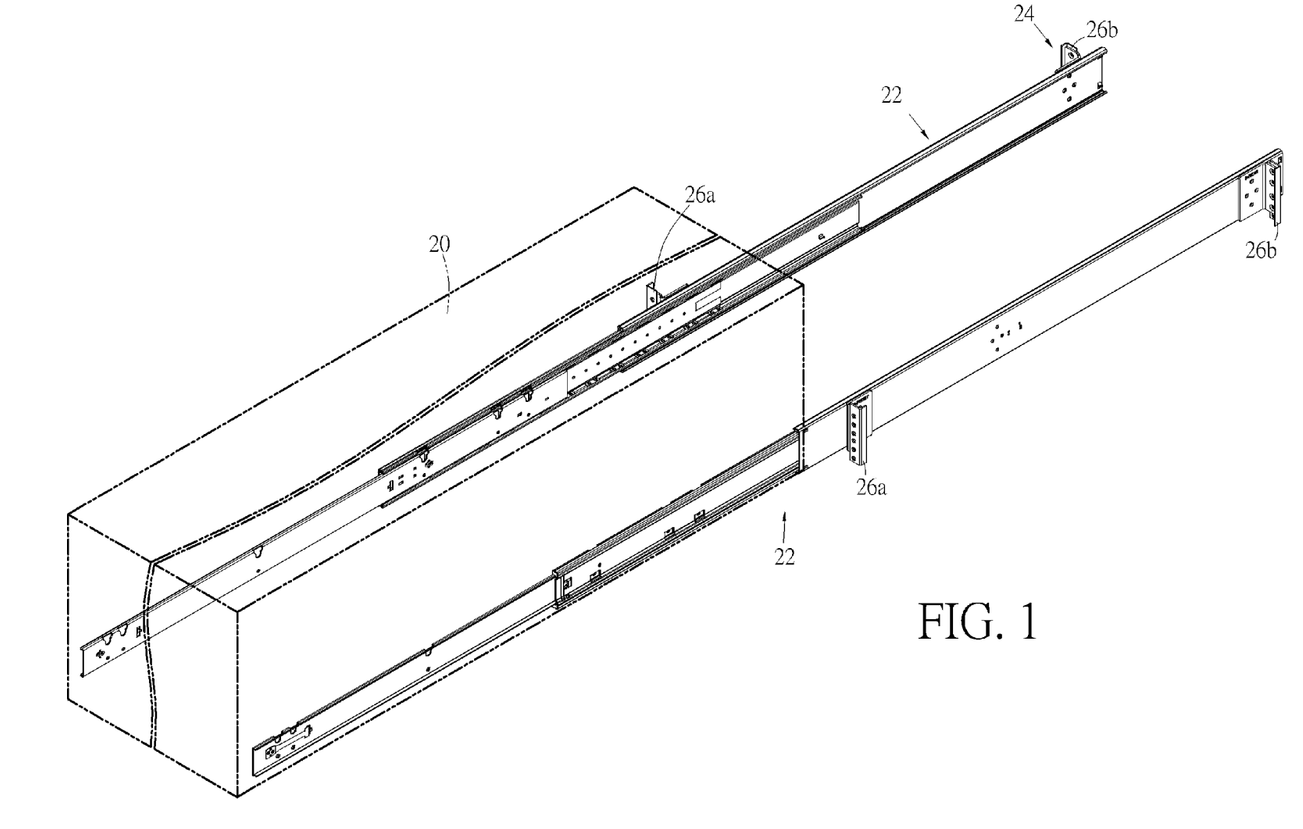
FIG. 1 is a diagram showing a fully extended slide rail assembly capable of mounting a carried object to a rack according to an embodiment of the present invention.

As shown in FIG. 1, a carried object 20 can be mounted to a rack 24 through a pair of slide rail assemblies 22. The carried object 20 can be an electronic device, a chassis, or a drawer. Each of the slide rail assemblies 22 is mounted to a first post 26a and a second post 26b of the rack 24. The carried object 20 can be conveniently pulled out from the rack 24 for maintenance or installation with assistance of the pair of slide rail assemblies 22.

Figure 2:
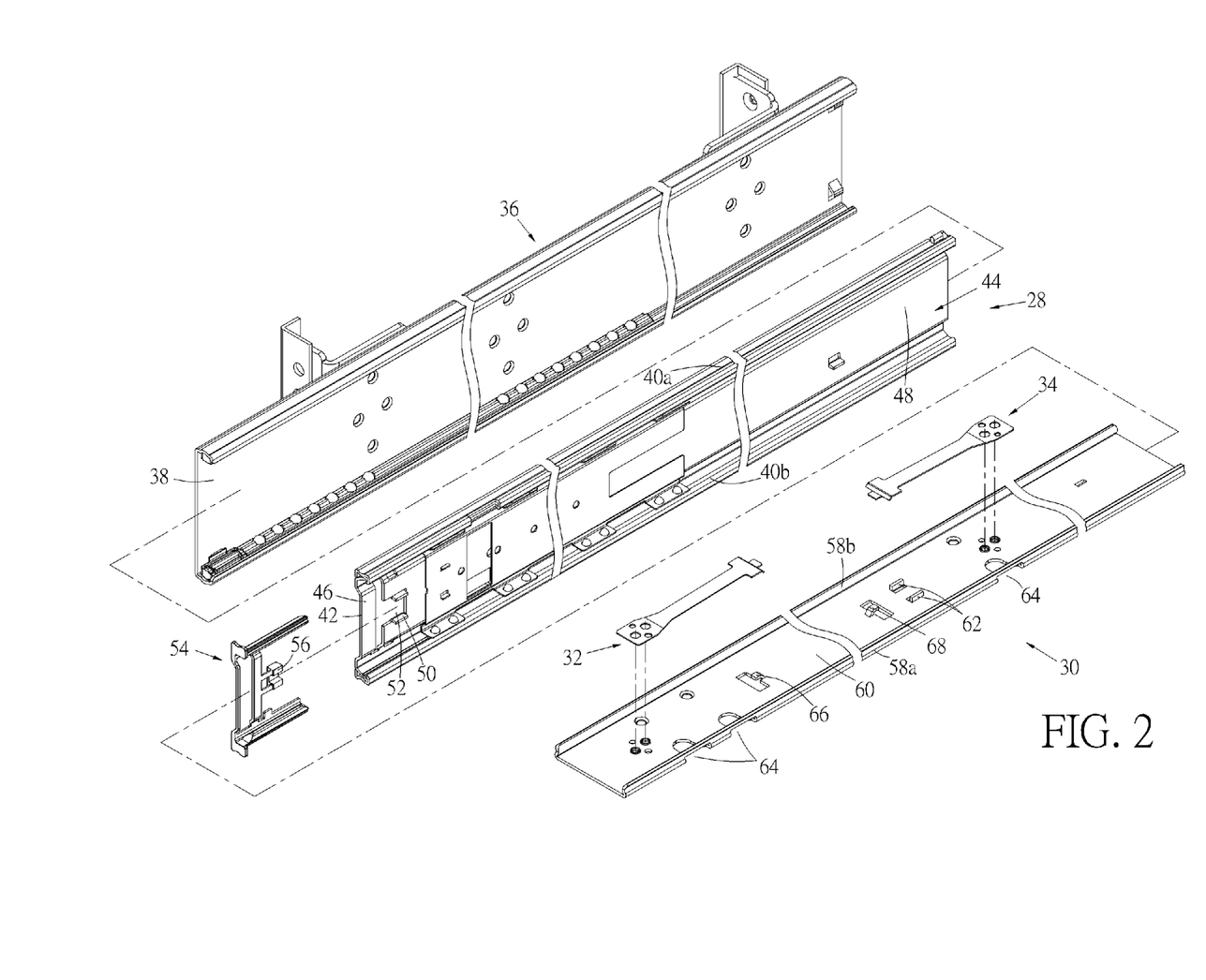
FIG. 2 is an exploded view of the slide rail assembly according to an embodiment of the present invention.

As shown in FIG. 2, the slide rail assembly comprises a first rail 28, a second rail 30, a first engagement element 32, and a second engagement element 34. Preferably, the slide rail assembly further comprises a third rail 36. The third rail 36 has a passage 38. The first rail 28 is movably connected to the third rail 36 for moving in the passage 38 of the third rail 36. The first rail 28 comprises an upper wall 40a, a lower wall 40b, and a longitudinal wall 42 connected between the upper wall 40a and the lower wall 40b. A passage 44 is defined by the upper wall 40a, the lower wall 40b, and the longitudinal wall 42. The first rail 28 has a front end 46, a rear end 48, and at least one first blocking part 50 located between the front end 46 and the rear end 48. In the present embodiment, the at least one first blocking part 50 is arranged to be adjacent to the front end 46. Preferably, the first rail 28 further has a release opening 52 located on the longitudinal wall 42 and adjacent to the front end 46, wherein the slide rail assembly further comprises a release element 54, and the release element 54 has a release part 56 corresponding to the release opening 52. The second rail 30 is movably connected to the first rail 28 for moving in the passage 44 of the first rail 28. Specifically, the second rail 30 comprises an upper wall 58a, a lower wall 58b, and a longitudinal wall 60 connected between the upper wall 58a and the lower wall 58b. The second rail has at least one second blocking part 62 arranged on the longitudinal wall 60, and a plurality of mounting holes 64.

Figure 3:
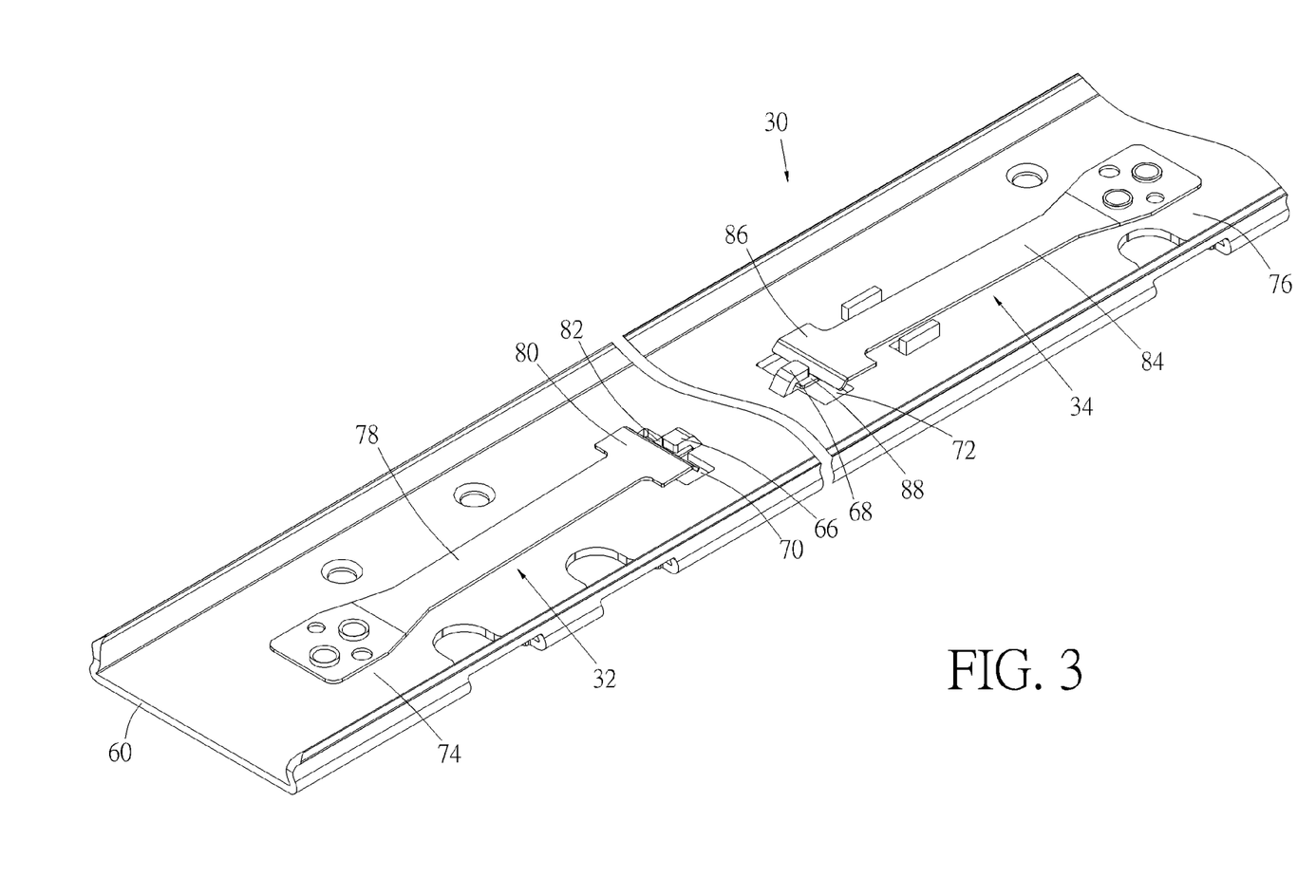
FIG. 3 is a diagram showing a first engagement element and a second engagement element connected to a second rail of the slide rail assembly according to an embodiment of the present invention.

As shown in FIG. 3, the second rail 30 has a first engaging part 66 and a second engaging part 68 arranged on the longitudinal wall 60 of the second rail 30, and a first hole 70 adjacent to the first engaging part 66 and a second hole 72 adjacent to the second engaging part 68. The first engagement element 32 is connected to a first portion 74 of the second rail 30. The second engagement element 34 is connected to a second portion 76 of the second rail 30. The first engagement element 32 comprises an elastic part 78 and a contact part 80 connected to the elastic part 78. Preferably, the first engagement element 32 further comprises a supporting section 82 connected to the contact part 80. The supporting section 82 of the first engagement element 32 abuts against the first engaging part 66 of the second rail 30 and corresponds to the first hole 70. The second engagement element 34 comprises an elastic part 84 and a contact part 86 connected to the elastic part 84. Preferably, the second engagement element 34 further comprises a supporting section 88 connected to the contact part 86. The supporting section 88 of the second engagement element 34 abuts against the second engaging part 68 of the second rail 30 and corresponds to the second hole 72.

Figure 4:
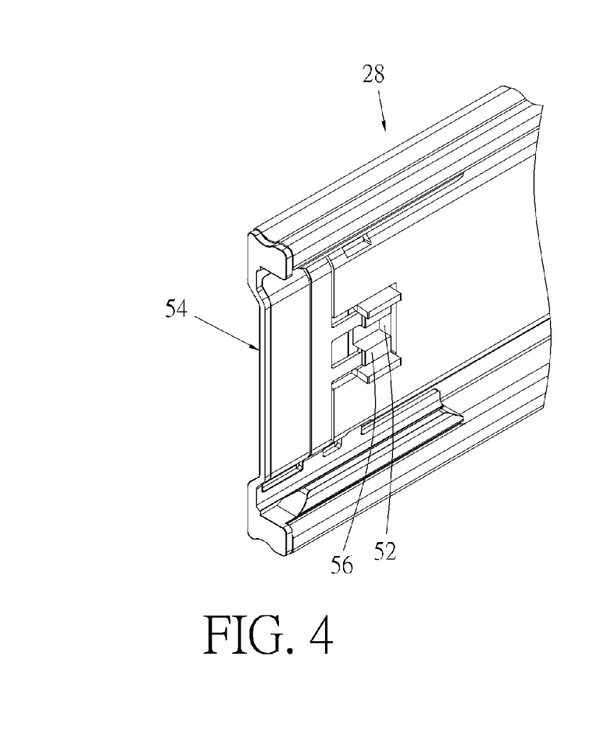
FIG. 4 is a diagram showing a release element of the slide rail assembly installed to a first rail according to an embodiment of the present invention.
Figure 5:
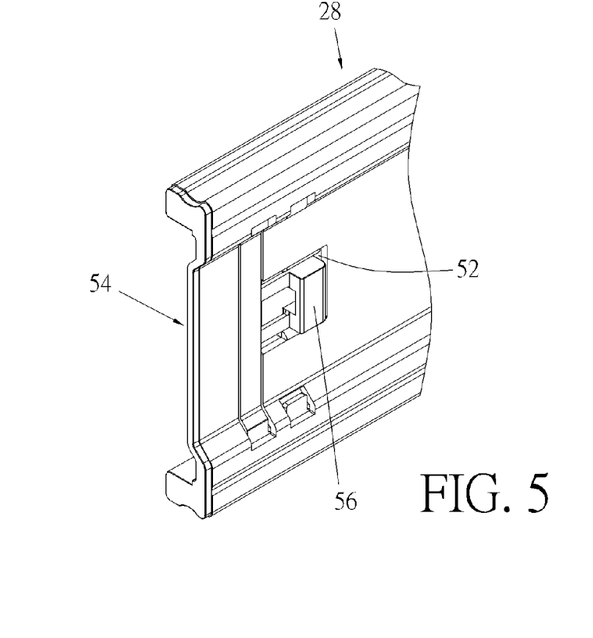
FIG. 5 is a diagram showing the release element in FIG. 4 installed to the first rail in another view angle.

As shown in FIG. 4 and FIG. 5. The release element 54 is installed on the first rail 28. The release part 56 of the release element 54 is located in the release opening 52 of the first rail 28.

Figure 6:
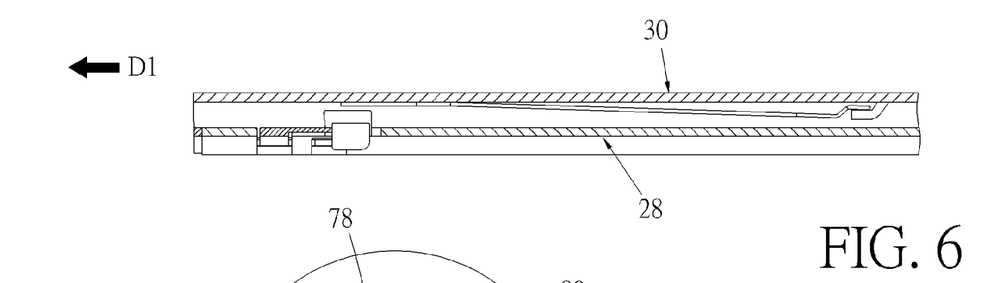
FIG. 6 is a diagram showing the second rail of the slide rail assembly in a retrieve state relative to the first rail according to an embodiment of the present invention.
Figure 7:
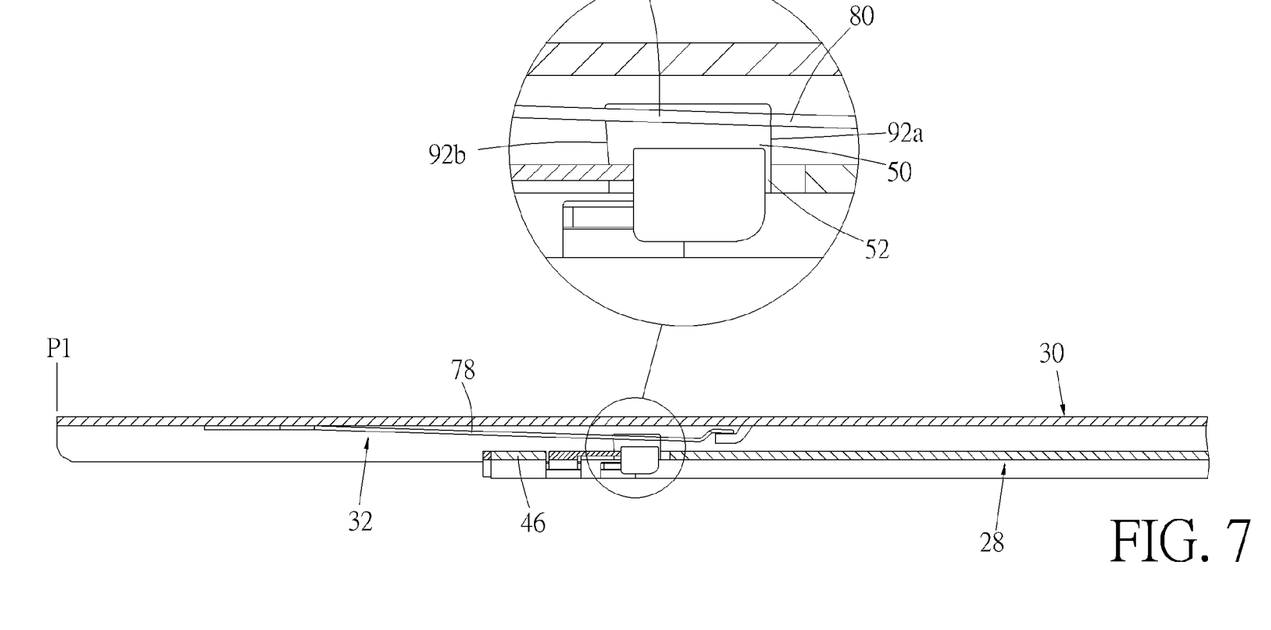
FIG. 7 is a diagram showing the first engagement element of the slide rail assembly abutting against a first blocking part of the first rail according to an embodiment of the present invention.

As shown in FIG. 6 and FIG. 7. The first blocking part 50 has a first side 92a and a second side 92b corresponding to the first side 92a. When the second rail 30 is moved relative to the first rail 28 along a first direction D1 from a retrieve state to a first position P1 beyond the front end 46 of the first rail 28, the contact part 80 of the first engagement element 32 abuts against the first side 92a of the first blocking part 50 of the first rail 28, and at least part of the elastic part 78 corresponds to the release opening 52.

Figures 8, 9:
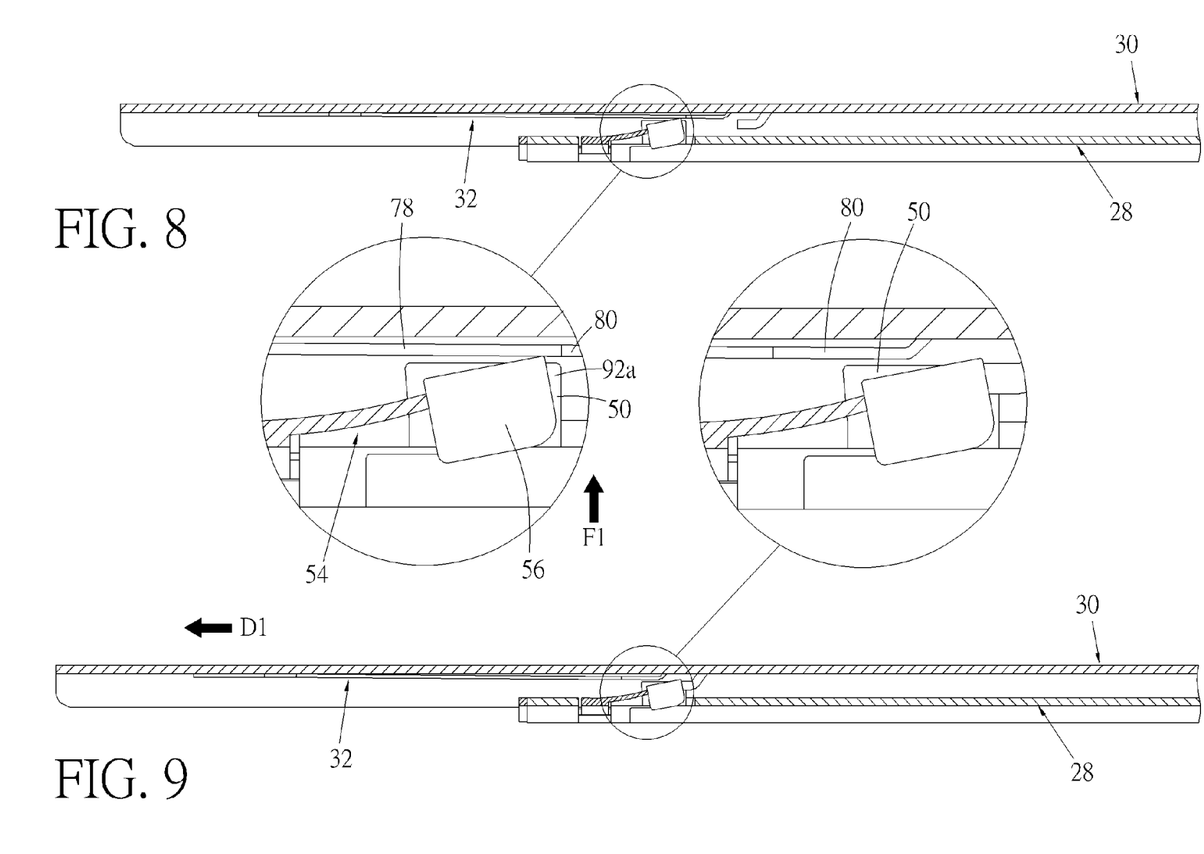
FIG. 8 is a diagram showing the release element of the slide rail assembly being operated to release a contact part of the first engagement element from the first blocking part of the first rail according to an embodiment of the present invention.
FIG. 9 is a diagram showing the second rail in FIG. 8 continuing moving along a first direction relative to the first rail.

As shown in FIG. 8, when the second rail 30 is located at the first position P1 relative to the first rail 28, a user can operate the first engagement element 32 through the release opening 52, such as pressing the release part 56 of the release element 54, to indirectly apply a force F1 to the elastic part 78 of the first engagement element 32 for moving the elastic part 78 of the first engagement element 32, such that the contact part 80 of the first engagement element 32 no longer abuts against the first side 92a of the first blocking part 50 of the first rail 28. In other words, the first engagement element 32 is operatively detached from the first blocking part 50 of the first rail 28.

As shown in FIG. 9, after the contact part 80 of the first engagement element 32 is detached from the first side 92a of the first blocking part 50 of the first rail 28, the second rail 30 can continue to move relative to the first rail 28 along the first direction D1.

Figures 10, 11:
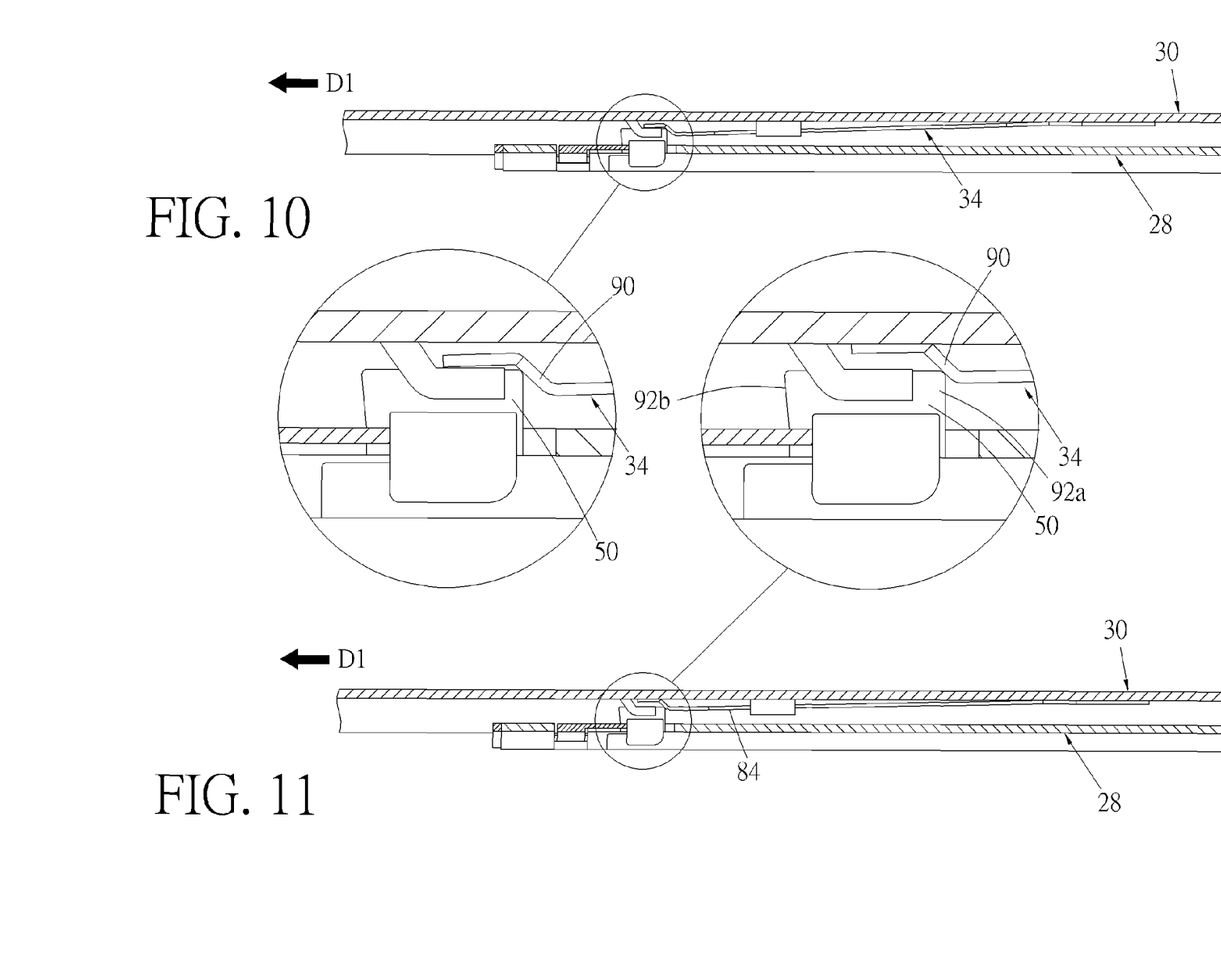
FIG. 10 is a diagram showing the second engagement element of the slide rail assembly abutting against the first blocking part of the first rail according to an embodiment of the present invention.
FIG. 11 is a diagram showing the second engagement element in FIG. 10 crossing a first side of the first blocking part of the first rail with assistance of a first guiding section for allowing the second rail to move relative to the first rail along the first direction according to an embodiment of the present invention.

As shown in FIG. 10 and FIG. 11, in a preferred embodiment, the second engagement element 34 has a first guiding section 90. When the second rail 30 continues to move relative to the first rail 28 along the first direction D1, the second engagement element 34 can be moved to cross the first side 92a of the first blocking part 50 of the first rail 28 with guiding assistance of the first guiding section 90. The elastic part 84 of the second engagement element 34 generates an elastic force in response to the movement of the first guiding section 90.

Figures 12, 13:
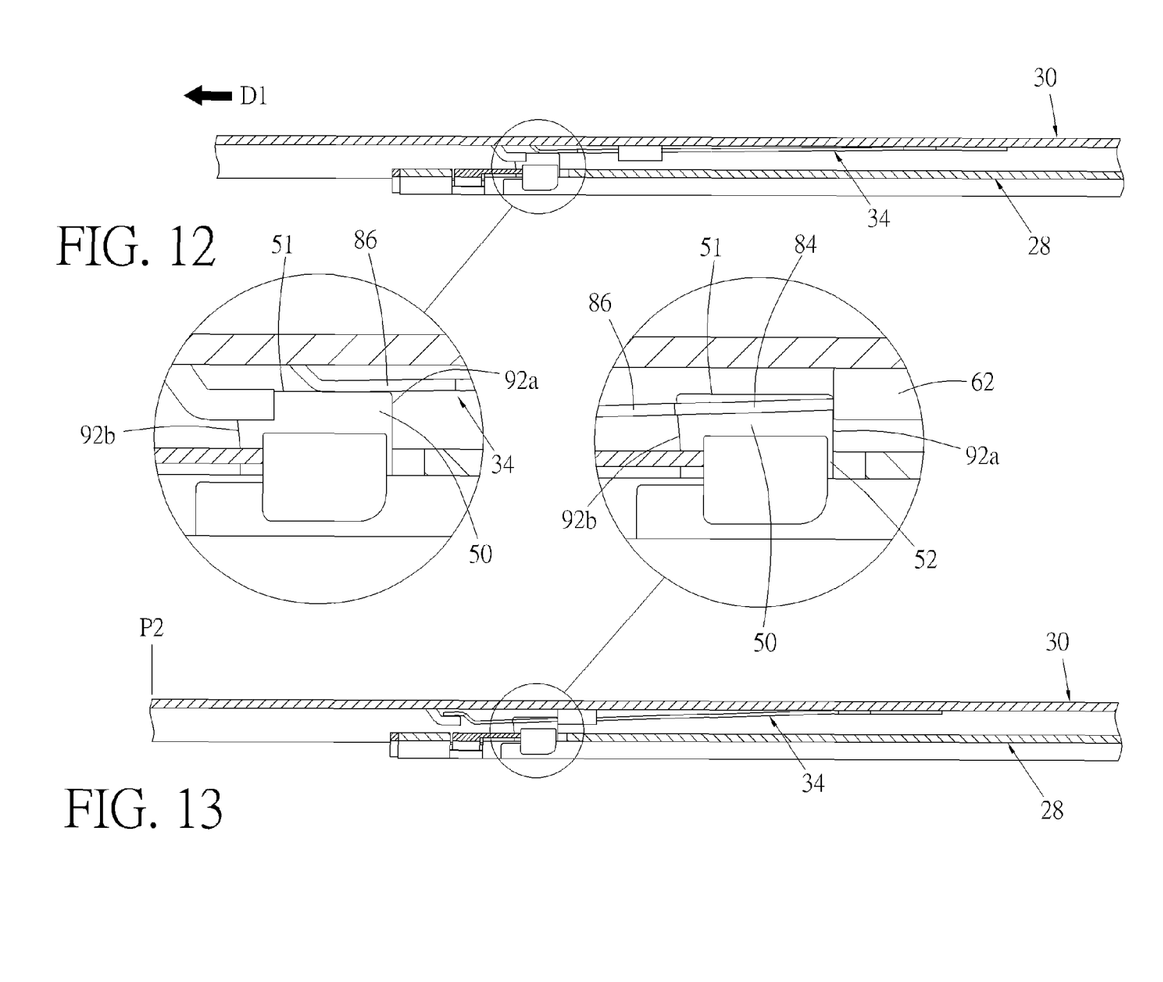
FIG. 12 is a diagram showing a contact part of the second engagement element abutting against a surface of the first blocking part of the first rail according to an embodiment of the present invention.
FIG. 13 is a diagram showing the contact part of the second engagement element in FIG. 12 and a second blocking part of the second rail located at two sides of the first blocking part for holding the second rail at a second position relative to the first rail according to an embodiment of the present invention.

As shown in FIG. 12 and FIG. 13, when the second rail 30 continues to move relative to the first rail 28 along the first direction D1, the contact part 86 of the second engagement element 34 crosses the first side 92a of the first blocking part 50 to abut against a surface 51 of the first blocking part 50. When the contact part 86 of the second engagement element 34 is moved apart from the surface 51 of the first blocking part 50 to cross the second side 92b of the first blocking part 50 of the first rail 28, the contact part 86 of the second engagement element 34 moves to a position corresponding to the second side 92b of the first blocking part 50 of the first rail 28 is response to release of the elastic force of the elastic part 84 of the second engagement element 34. In the meantime, the second blocking part 62 of the second rail 30 abuts against the first side 92a of the first blocking part 50 of the first rail 28 for locating the second rail 30 at a second position P2 relative to the first rail 28. In the above state, the second blocking part 62 of the second rail 30 and the contact part 86 of the second engagement element 34 are located adjacent to or abut against the first side 92a and the second side 92b of the first blocking part 50 of the first rail 28 respectively, for holding the second rail 30 at the second position P2 relative to the first rail 28. In addition, when the second rail 30 is located at the second position P2 relative to the first rail 28, at least part of the elastic part 84 of the second engagement element 34 corresponds to the release opening 52.

Figures 14, 15:
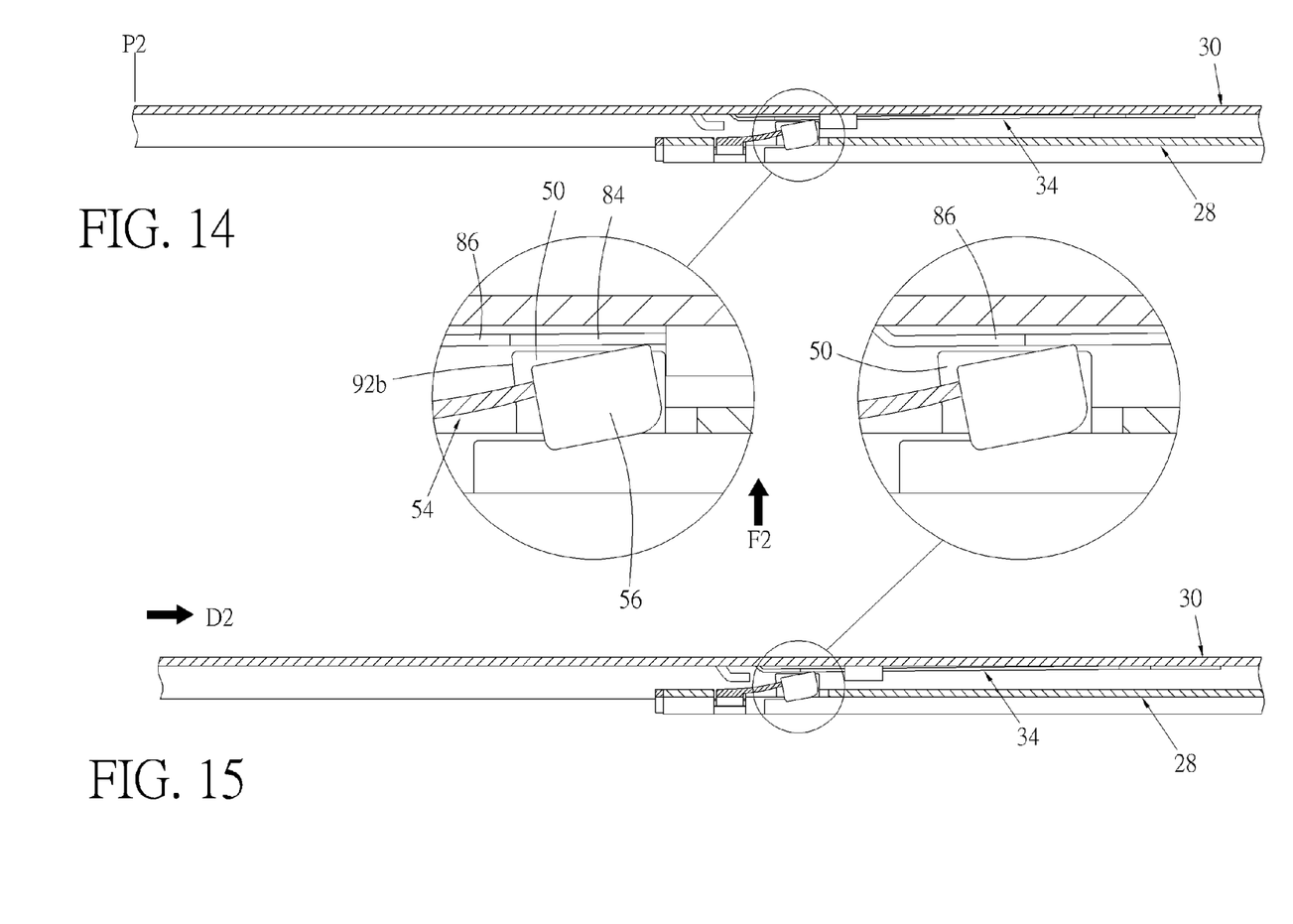
FIG. 14 is a diagram showing the release element of the slide rail assembly being operated to release a contact part of the second engagement element from the first blocking part of the first rail according to an embodiment of the present invention.
FIG. 15 is a diagram showing the second rail in FIG. 14 capable of moving relative to the first rail along a second direction.

As shown in FIG. 14, when the second rail 30 is held at the second position P2 relative to the first rail 28, the user can operate the second engagement element 34 through the release opening 52, such as pressing the release part 56 of the release element 54, to indirectly apply a force F2 to the elastic part 84 of the second engagement element 34 for moving the elastic part 84 of the second engagement element 34, such that the contact part 86 of the second engagement element 34 no longer abuts against the second side 92b of the first blocking part 50 of the first rail 28. In other words, the second engagement element 34 is operatively detached from the first blocking part 50 of the first rail 28.

Please refer to FIG. 15, and refer to FIG. 14 as well, when the contact part 86 of the second engagement element 34 is detached from the first blocking part 50 of the first rail 28, the second rail 30 can move relative to the first rail 28 along a second direction D2, that is, the second rail 30 moves toward the first position P1.

Figures 16, 17:
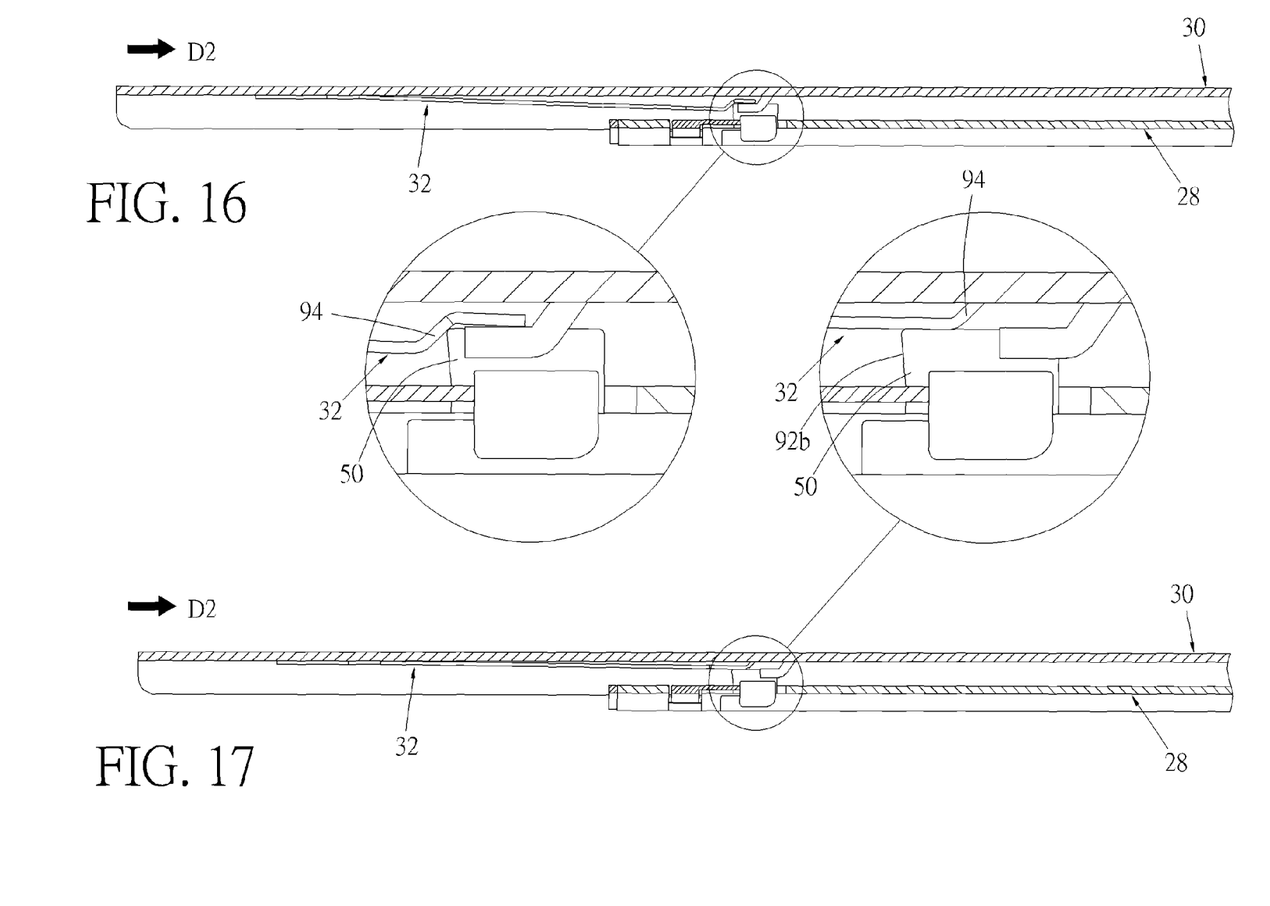
FIG. 16 is a diagram showing the first engagement element of the slide rail assembly abutting against the first blocking part of the first rail according to an embodiment of the present invention.
FIG. 17 is a diagram showing the first engagement element in FIG. 16 crossing a second side of the first blocking part of the first rail with assistance of a second guiding section.
Figures 18, 19:
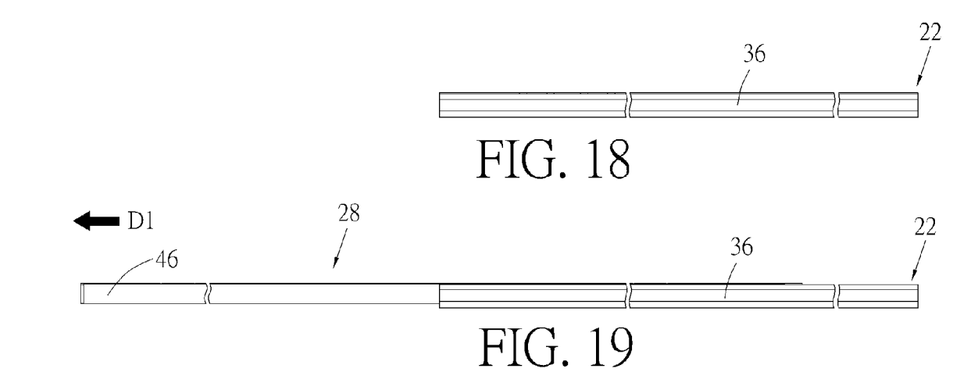
FIG. 18 is a diagram showing the slide rail assembly in a retrieve state according to an embodiment of the present invention.
FIG. 19 is a diagram showing the first rail of the slide rail assembly being pulled out to move relative to a third rail according to an embodiment of the present invention.
Figure 20:
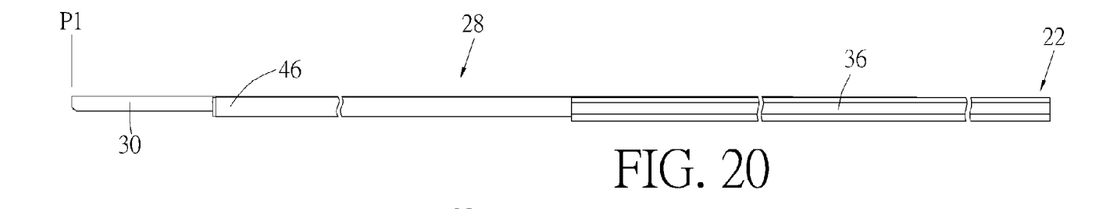
FIG. 20 is a diagram showing the second rail of the slide rail assembly moving relative to the first rail to a first position according to an embodiment of the present invention.
Figure 21:
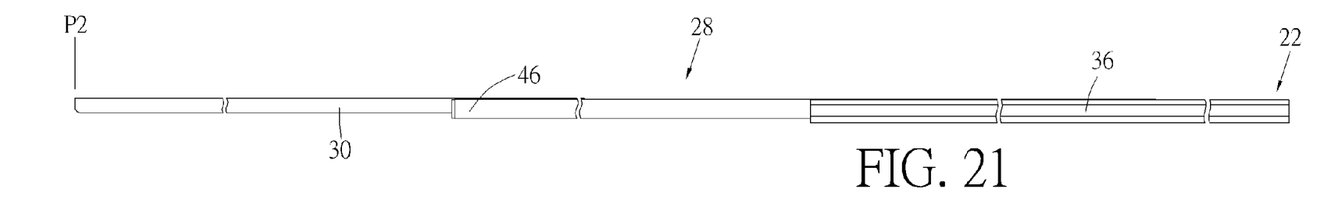
FIG. 21 is a diagram showing the second rail of the slide rail assembly moving relative to the first rail to a second position according to an embodiment of the present invention.

As shown in FIG. 16 and FIG. 17, in a preferred embodiment, the first engagement element 32 has a second guiding section 94. When the second rail 30 continues to move relative to the first rail 28 along the second direction D2, the first engagement element 32 can cross the second side 92b of the first blocking part 50 of the first rail 28 with guiding assistance of the second guiding section 94, in order to retrieve the second rail 30 relative to the first rail 28.

As shown in FIG. 18 to FIG. 21, the first rail 28 and the second rail 30 move relative to the third rail 36 along the first direction D1. When the second rail 30 moves relative to the first rail 28 to the first position P1 beyond the front end 46 of the first rail 28, the second rail 30 is blocked by the first engagement element, such that extension length of the sliding rail assembly can be shortened for different requirements.

If the extension length is required to be further increased, the user can operate the first engagement element 32 through the release opening 52 of the first rail 28 to release the first engagement element 32 from the first blocking part 50 of the first rail 28 (please refer to FIG. 8 to FIG. 13 again, for simplification, no further illustration is provided), such that the second rail 30 can move relative to the first rail 28 from the first position P1 to the second position P2. As such, the user can operate to move the second rail 30 relative to the first rail 28 to the first position P1 or the second position P2 according to actual requirements, in order to change the moving distance of the second rail 30 relative to the first rail 28. Therefore, for application of the slide rail assembly 22, such as when the second rail 30 is mounted with the carried object 20, the slide rail assembly 22 can fit the moving distance of the carried object 20 to the surrounding space, and provide safety and convenience when the user performs installation and maintenance on the carried object 20.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
   a first rail comprising a front end and a first blocking part;
   a second rail movably connected to the first rail, the second rail comprising a second blocking part;
   a first engagement element having a first end fixedly connected to a first portion of the second rail and a second end tilted away from the second rail; and
   a second engagement element having a first end fixedly connected to a second portion of the second rail and a second end tilted away from the second rail, the second engagement element having a first guiding section;
   wherein when the second rail moves relative to the first rail to a first position beyond the front end of the first rail along a direction, the first engagement element abuts against the first blocking part of the first rail for preventing the second rail from moving relative to the first rail from the first position along the direction;
   wherein when the first engagement element is operatively detached from the first blocking part of the first rail for allowing the second rail to move relative to the first rail from the first position to a second position, the second engagement element crosses the first blocking part of the first rail with assistance of the first guiding section, and the second blocking part of the second rail abuts against the first blocking part of the first rail for holding the second rail at the second position relative to the first rail.

2. The slide rail assembly of claim 1, wherein the first rail has a release opening, the first engagement element comprises an elastic part and a contact part connected to the elastic part, and when the second rail is located at the first position relative to the first rail, the contact part of the first engagement element abuts against the first blocking part of the first rail, and at least part of the elastic part of the first engagement element corresponds to the release opening.

3. The slide rail assembly of claim 2, further comprising a release element installed on the first rail, the release element having a release part corresponding to the release opening.

4. The slide rail assembly of claim 1, wherein the first rail has a release opening, the second engagement element comprises an elastic part and a contact part connected to the elastic part, and when the second rail is located at the second position relative to the first rail, the contact part of the second engagement element and the second blocking part of the second rail are respectively located at two sides of the first blocking part of the first rail, and at least part of the elastic part of the second engagement element corresponds to the release opening.

5. The slide rail assembly of claim 4, further comprising a release element installed on the first rail, the release element having a release part corresponding to the release opening.

6. The slide rail assembly of claim 4, wherein the first engagement element has a second guiding section, and when the second rail moves from the second position toward the first position, the first engagement element crosses the first blocking part of the first rail with assistance of the second guiding section.

7. The slide rail assembly of claim 1, further comprising a third rail, wherein the first rail is movably connected to the third rail.

8. The slide rail assembly of claim 1, wherein the first engagement element is operatively detached from the first blocking part of the first rail by moving the second end of the first engagement element toward the second rail.

9. A slide assembly, comprising:
   a first rail comprising a front end, a first blocking part and a release opening, wherein the first blocking part has a first side and a second side corresponding to the first side;
   a second rail movably connected to the first rail;
   a first engagement element having a first end fixedly connected to a first portion of the second rail and a second end tilted away from the second rail; and
   a second engagement element having a first end fixedly connected to a second portion of the second rail and a second end tilted away from the second rail, the second engagement element having a guiding section;
   wherein when the second rail moves relative to the first rail along a direction to a first position beyond the front end of the first rail, the first engagement element abuts against the first side of the first blocking part of the first rail for preventing the second rail from moving relative to the first rail from the first position along the direction, and at least part of the first engagement element corresponds to the release opening;
   wherein when the first engagement element is operatively detached from the first blocking part of the first rail through the release opening for allowing the second rail to move from the first position relative to the first rail along the direction, until the second engagement element crosses the first blocking part of the first rail with assistance of the guiding section to be adjacent to the second side of the first blocking part, the second rail is located at a second position relative to the first rail.

10. The slide rail assembly of claim 9, wherein the second rail comprises a second blocking part, when the second rail is located at the second position, the second blocking part of the second rail is adjacent to the first side of the first blocking part of the first rail for holding the second rail at the second position relative to the first rail, and at least part of the second engagement element corresponds to the release opening.

11. The slide rail assembly of claim 9, wherein the first engagement element is operatively detached from the first blocking part of the first rail by moving the second end of the first engagement element toward the second rail.

12. A slide rail assembly, comprising:
   a first rail comprising a blocking part and a release opening;
   a second rail movably connected to the first rail;
   a first engagement element having a first end fixedly connected to a first portion of the second rail and a second end tilted away from the second rail; and a second engagement element having a first end fixedly connected to a second portion of the second rail and a second end tilted away from the second rail;

wherein when the second rail moves relative to the first rail along a direction to a first position, the first engagement element abuts against the blocking part of the first rail for preventing the second rail from moving relative to the first rail from the first position along the direction, and at least part of the first engagement element corresponds to the release opening;

wherein when the first engagement element is operatively detached from the blocking part of the first rail through the release opening for allowing the second rail to move relative to the first rail along the direction from the first position to a second position, and at least part of the second engagement element is adjacent to the blocking part of the first rail.

13. The slide rail assembly of claim 12, wherein the first engagement element is operatively detached from the first blocking part of the first rail by moving the second end of the first engagement element toward the second rail.

* * * * *